(12) United States Patent
Proctor, Jr. et al.

(10) Patent No.: US 6,941,152 B2
(45) Date of Patent: Sep. 6, 2005

(54) WIRELESS SUBSCRIBER NETWORK REGISTRATION SYSTEM FOR CONFIGURABLE SERVICES

(75) Inventors: James A. Proctor, Jr., Indialantic, FL (US); Anthony Francesca, Pleasanton, CA (US)

(73) Assignee: IPR Licensing, Inc., Wilmington, DE (US)

( * ) Notice: Subject to any disclaimer, the term of this patent is extended or adjusted under 35 U.S.C. 154(b) by 609 days.

(21) Appl. No.: 09/841,695

(22) Filed: Apr. 24, 2001

(65) Prior Publication Data

US 2002/0155829 A1 Oct. 24, 2002

(51) Int. Cl.[7] ............................................. H04Q 7/20
(52) U.S. Cl. ................. 455/522; 455/423; 455/67.11; 455/435.1; 343/700; 343/703
(58) Field of Search ..................... 455/169, 435.1, 455/522, 423, 67.11, 560; 375/219; 343/700, 824, 703

(56) References Cited

U.S. PATENT DOCUMENTS

| | | | | |
|---|---|---|---|---|
| 4,613,990 A | * | 9/1986 | Halpern | 455/522 |
| 4,636,741 A | * | 1/1987 | Mitzlaff | 330/127 |
| 5,175,871 A | * | 12/1992 | Kunkel | 455/69 |
| 5,212,823 A | * | 5/1993 | Fujii et al. | 455/522 |
| 5,239,695 A | * | 8/1993 | Jung | 455/126 |
| 5,483,676 A | * | 1/1996 | Mahany et al. | 455/67.14 |
| 5,490,287 A | * | 2/1996 | Itoh et al. | 455/41.3 |
| 5,579,379 A | | 11/1996 | D'Amico et al. | 379/112 |
| 5,588,043 A | * | 12/1996 | Tiedemann et al. | 455/435.1 |
| 5,664,005 A | | 9/1997 | Emery et al. | 455/422 |
| 5,754,955 A | * | 5/1998 | Ekbatani | 455/422.1 |
| 5,758,281 A | | 5/1998 | Emery et al. | 455/428 |
| 5,802,445 A | | 9/1998 | Wiedeman et al. | 455/12.1 |
| 5,812,932 A | | 9/1998 | Wiedeman et al. | 455/13.1 |
| 5,867,109 A | | 2/1999 | Wiedeman | 340/827 |
| 5,886,667 A | * | 3/1999 | Bondyopadhayay | 343/700 MS |
| 5,893,036 A | * | 4/1999 | Trandai et al. | 455/522 |
| 5,910,946 A | * | 6/1999 | Csapo | 370/328 |
| 5,918,157 A | | 6/1999 | Wiedeman et al. | 455/13.1 |
| 5,920,815 A | | 7/1999 | Akhavan | 455/426 |
| 5,926,747 A | * | 7/1999 | Komara et al. | 455/69 |
| 6,008,758 A | * | 12/1999 | Campbell | 342/358 |
| 6,028,884 A | | 2/2000 | Silberger et al. | 375/200 |

(Continued)

FOREIGN PATENT DOCUMENTS

SE    PCT/SE96/00555    * 10/1996    ............ H04B/1/38

*Primary Examiner*—William Trost
*Assistant Examiner*—James D Ewart
(74) *Attorney, Agent, or Firm*—Hamilton, Brook, Smith & Reynolds, P.C.

(57) ABSTRACT

In a wireless telecommunications network, wireless transmissions are carried via an RF medium between users and a central wireless transceiver, or base station processor. A subscriber access unit connected to a user device such as a user PC is employed to transmit wireless messages to and from the base station processor. Multiple, simultaneous wireless transmissions to the base station from different subscriber access units can have a tendency to interfere with each other. Subscriber access units employing an omnidirectional antenna or which are highly mobile will tend to experience more interference than stationary users or subscriber access units employing a directional antenna. The allocation of wireless transmission resources to retransmit wireless messages over a lossy link can have a detrimental effect on wireless resources available for other users. A system which allows a subscriber access unit to register device capabilities with a base station processor to determine the degree to which a particular subscriber access unit may be prone to interference provides computation and adjustment of transmission constraints for each subscriber access unit accordingly to maximize throughput.

6 Claims, 5 Drawing Sheets

U.S. PATENT DOCUMENTS

| | | | |
|---|---|---|---|
| 6,097,948 A | 8/2000 | Sjödin | 455/426 |
| 6,134,423 A | 10/2000 | Wiedeman et al. | 455/117 |
| 6,192,252 B1 | 2/2001 | Lysejko et al. | 455/512 |
| 6,212,395 B1 | 4/2001 | Lu et al. | 455/463 |
| 6,216,010 B1 * | 4/2001 | Edwards et al. | 455/522 |
| 6,233,466 B1 | 5/2001 | Wong et al. | 455/562 |
| 6,272,325 B1 | 8/2001 | Wiedeman et al. | 455/117 |
| 6,272,341 B1 | 8/2001 | Threadgill et al. | 455/428 |
| 6,366,244 B1 * | 4/2002 | Fernandes | 343/700 MS |
| 6,411,818 B1 * | 6/2002 | O'Reilly | 455/522 |
| 6,429,825 B1 * | 8/2002 | Martek | 343/770 |
| 6,452,912 B1 * | 9/2002 | Leem | 370/335 |
| 6,473,036 B2 * | 10/2002 | Proctor, Jr. | 342/372 |
| 6,697,415 B1 * | 2/2004 | Mahany | 375/130 |
| 2002/0191570 A1 * | 12/2002 | Kim et al. | 370/335 |

* cited by examiner

Access Unit Registration Table

| Subscriber ID | Subscriber Type | Antenna Type | Transmission Profile |
|---|---|---|---|
|  |  |  | P1 |
|  |  |  | P2 |

FIG. 3A

Transmission Constraint Table

| Transmission Profile | Power Level | FEC rate | Modulation |
|---|---|---|---|
| P1 |  |  |  |
| P2 |  |  |  |

FIG. 3B

Access Unit Registration Table

| Subscriber ID | Subscriber Type | Antenna Type | Transmission Profile |
|---|---|---|---|
| S14a | Mobile | Omnidirectional | P1 |
| S14b | Fixed | 4 Degrees | P2 |

FIG. 4A

Transmission Constraint Table

| Transmission Profile | Power Level | FEC rate | Modulation | Data Rate |
|---|---|---|---|---|
| P1 | 23dBm | 1/2 | QPSK | 0.050 mbps |
| P2 | 33dBm | 4/5 | 64-QAM | 0.366 mbps |

WIRELESS SUBSCRIBER NETWORK REGISTRATION SYSTEM FOR CONFIGURABLE SERVICES

BACKGROUND OF THE INVENTION

In a wireless telecommunications network, wireless transmissions are carried via an RF medium between users and a central wireless transceiver, or base station processor. A subscriber access unit connected to a user device such as a user PC is employed to transmit wireless messages to and from the base station processor. In a wireless network, wireless transmission resources are typically allocated among many subscriber access units to serve many users. Therefore, many subscriber access units are transmitting to and receiving from a common base station processor via the RF medium.

Multiple, simultaneous RF transmissions to the base station from different subscriber access units can have a tendency to interfere with each other. Techniques including Code Division Multiple Access (CDMA) and power control are often employed to mitigate such interference. However, factors such as distance and the mobility of the user can limit the degree to which the interference may be mitigated. Further, certain device capabilities, for example the type of antenna employed, can affect interference. Directional antennas, which can focus a transmitted signal among several degrees of freedom to correspond to the base station processor, are less prone to interference than omnidirectional antennas, which transmit with equal strength in all directions.

Therefore, subscriber access units employing an omnidirectional antenna or which are highly mobile will tend to experience more interference than stationary users or subscriber access units employing a directional antenna. However, since interference results in retransmission of dropped messages, the result may be a disproportionate amount of wireless resources being allocated to a subscriber access unit which is prone to interference, sometimes called a lossy link. The allocation of wireless transmission resources to retransmit wireless messages over a lossy link can have a detrimental effect on wireless resources available for other users. Accordingly, it would be beneficial to provide a system and method for a subscriber access unit to register device capabilities with a base station processor to determine the degree to which a particular subscriber access unit may be prone to interference, and adjust transmission constraints for that subscriber access unit accordingly.

SUMMARY OF THE INVENTION

In a wireless telecommunications network, a method for managing transmission constraints based on subscriber device capabilities allows transmission constraints to be set for each user to maximize throughput in the wireless telecommunications network. A set of device capabilities corresponding to a local transceiver device or subscriber access unit connected to the user in the wireless telecommunications network is determined. The device capabilities are registered with a remote wireless transceiver device such as a base station processor, which is in wireless communication with the local transceiver device. A set of transmission constraints is computed based on the device capabilities, and the transmission constraints corresponding to the transceiver device are applied to the wireless transmissions between the transceiver device and the remote transceiver device.

The wireless transceiver device is typically a subscriber access unit connected to a user device such as a user PC, and the remote transceiver device is a base station processor which is also in wireless communication with other subscriber access units. The device capabilities include antenna characteristics, and whether the user mobility is fixed, mobile, or a pedestrian. When activated, the subscriber access unit transmits the device capabilities to the base station processor. Alternatively, the base station processor can receive the device capabilities from a central repository such as a wireless Internet facility (WIF), based on an index such as a subscriber ID or electronic serial number (ESN) which is indicative of the subscriber access unit. The base station processor receives and stores, or registers, the device capabilities, and computes a set of transmission constraints based upon the ability of the subscriber access unit to receive wireless transmissions. The transmission constraints are computed on an expected likelihood of interference and dropped packets, and include parameters such as transmission power, forward error correction (FEC) coding rate, and modulation.

The transmission constraints are computed such that a subscriber access unit which is more prone to interference and lost packets does not consume a disproportionate share of wireless transmission resources. A subscriber access unit that is nearby, stationary, and transmitting with a directional antenna is likely to experience little interference and is more likely of sustaining a relatively high transmission throughput rate. Accordingly, the base station processor may allocate more wireless transmission resources, such as wireless channels, to such a user. Similarly, a user that is distant, mobile, and transmitting with an omnidirectional antenna is likely to experience more interference and lost packets. Accordingly, the transmission constraints computed by the base station processor may include increasing the error correction rate and limiting the overall transmission rate so that the base station processor does not allocate excessive resources in order to maintain a high data rate over a lossy link.

BRIEF DESCRIPTION OF THE DRAWINGS

FIG. 3a shows an access unit registration table;

FIG. 3b shows a transmission constraint table;

FIGS. 4a–4c show an example of registration and transmission according to the invention as defined by the present claims.

Figure 1:
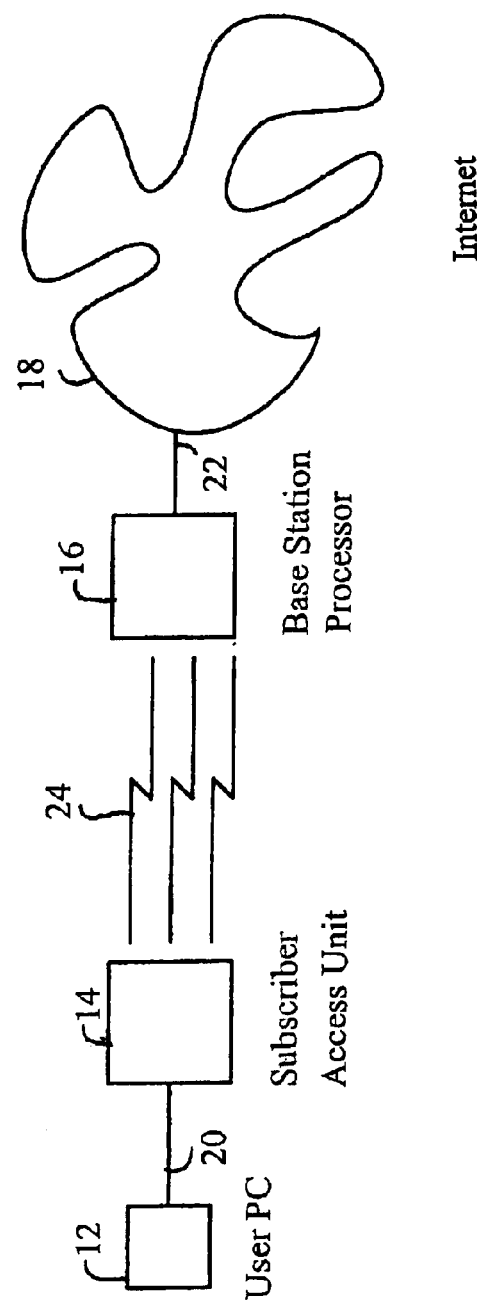
FIG. 1 shows a wireless communication system suitable for performing wireless transmission according to the present invention.

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

FIG. 1 shows a wireless communication system suitable for performing wireless subscriber registration according to the invention as defined by the present claims. Referring to FIG. 1, a user PC 12, or other access point into a user computer system or local area network is in communication with a subscriber access unit 14 via a wired connection 20. The wired connection 20 may be any suitable wired medium such as TCP/IP, Ethernet, or direct connection. The subscriber access unit 14 is in communication with a wireless transceiver, such as the base station processor 16, via a wireless link 24, and is operable to transmit wireless messages in an RF medium between the subscriber access unit 14 and the base station processor 16. The base station processor 16 is connected to the Internet 18 or other public access network via the Internet connection 22. The Internet connection 22 may also be any suitable wired line connection, such as TCP/IP, UDP/IP, Ethernet, T1 line, POTS (plain old telephone system) or other wired medium. An end user at the user PC 12 may therefore receive data from the Internet 18 via the wired connections 20, 22 and wireless link 24 supported by the base station processor 16 and the subscriber access unit 14.

Figure 2:
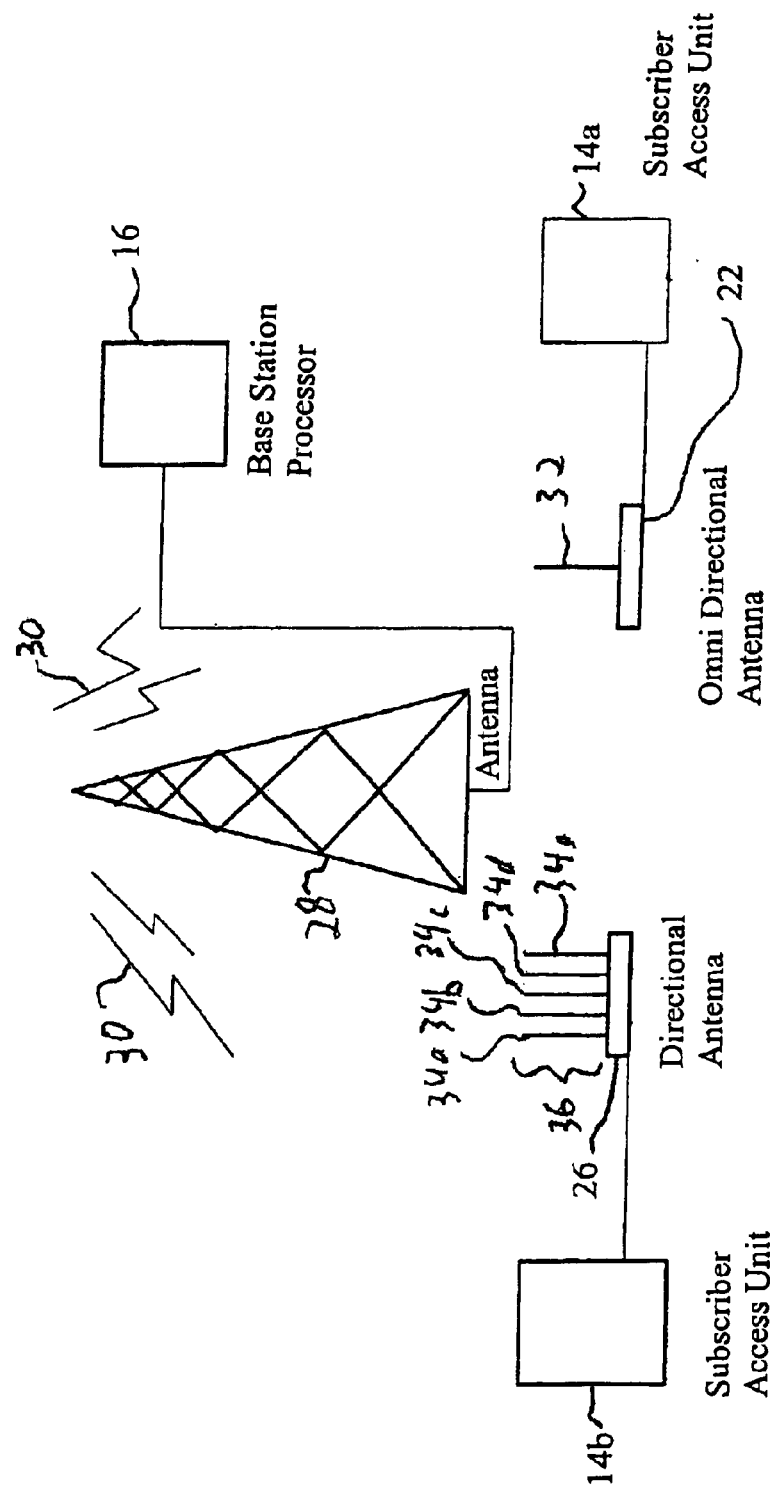
FIG. 2 shows wireless omnidirectional and directional antennas in a cell.

FIG. 2 shows wireless omnidirectional and directional antennas in a cell. Referring to FIG. 2, the cell is provided wireless services by the base station processor 16. Subscriber access units 14a and 14b are also located in the cell. In a typical cell, there are many subscriber access units, 14n generally, in communication with the base station processor 16. The subscriber access unit 14a is connected to an omnidirectional antenna 22, and the subscriber access unit 14b is connected to a directional antenna 26. The base station processor 16 is also connected to an antenna 28, and transmits and receives wireless signals 30 to and from the subscriber access units 14a and 14b via the antennas 22, 26 and 28.

Each of the subscriber access units 14a, 14b has device capabilities which are indicative of the particular subscriber access unit. In a particular embodiment, the device capabilities are indicative of the antenna type that a particular subscriber access unit employs, and the mobility, such as whether the subscriber access unit is fixed, mobile, or pedestrian. These and other device capabilities are employed in determining transmission constraints, described further below, which can affect the qualities of the wireless transmissions.

As indicated above, the omnidirectional antenna 22 transmits a signal of equal strength in all directions by employing a single radiating element 32. The directional antenna 26 transmits a focused signal which is stronger in a particular direction via an antenna array 36 having multiple radiating elements 34a–34e in the example shown. Various numbers and arrangements of radiating elements are configurable in an antenna array depending on the transmission characteristics sought. In a particular embodiment, the directional antenna has four radiating elements which form a square around a central fifth radiating element.

Depending on the antenna type, it may be beneficial to adjust certain transmission constraints. In the case of an omnidirectional antenna 22, it may be beneficial to reduce the power level employed, so as to minimize interference with signals between other subscriber access units 14n. Similarly, it may be beneficial to increase error correction such as the forward error correction (FEC) coding rate to reduce the number of lost packets, or to reduce the data throughput rate so that disproportionate wireless transmission resources are not expended. On the other hand, in the case of a directional antenna 26, it may be beneficial to increase the power level because the signals may be steered towards the antenna 28 connected to the base station processor. Further, a reduction in the FEC rate or an increase in data throughput rate may be performed if the link can effectively maintain a low rate of lost packets at a set of new transmission constraint settings. Other transmission constraints, discussed further below, are possible.

The transmission constraints may be adjusted in response to observed transmission characteristics over the wireless link. The transmission characteristics which may be observed include bit error rate (BER), interference level, dropped packets, and received power level. Other characteristics may also be employed. By observing transmission characteristics, a likelihood of a particular transmission succeeding can be determined. The likelihood is employed in computing transmission constraints for the subscriber access unit 14n.

When a subscriber access unit 14n enters a cell or is turned on in a cell, the device capabilities of the particular subscriber access unit 14n are received by the corresponding base station processor 16. The device capabilities may be sent by the subscriber access unit 14n itself, or may be sent from a wireless internet facility (WIF) based on a unique identifier such as an electronic serial number (ESN) or subscriber ID. The base station processor then regulates the transmissions by the subscriber access unit according to the device capabilities.

FIG. 3a shows an access unit registration table, and FIG. 3b shows a transmission constraint table. Referring to FIG. 3a, the access unit registration table 38 stores a subscriber profile having parameters 40 indicative of subscriber device capabilities. The table 38 stores subscriber profile entries 42 corresponding to each subscriber access unit 14n (FIG. 2). The subscriber profile entries list, for each subscriber, a subscriber ID 39a, which uniquely identifies the subscriber, a subscriber type 39b, which identifies the mobility of the user, an antenna type 39c, identifying the type of antenna employed by the subscriber access unit, and a transmission profile ID 39d, which is an index into the transmission constraint table 44 (FIG. 3b).

Referring to FIG. 3b, the transmission constraint table 44 stores transmission profile entries 48 indicative of the transmission constraints 46 which should be applied to each subscriber access unit 14. The transmission constraints 46 include power level 54b, indicative of the power, in dBm units, which should be employed for the corresponding subscriber, an FEC rate 54c, typically ½, ⅓, ¼, or ⅘, and a modulation type 54d, such as Binary Phase Shift Keyed (BPSK), Quadrature Phase Shift Keyed (QPSK), 16 bit Quadrature Amplitude Modulation (QAM 16), or QAM 64. A transmission profile identifier 54a is mapped from the transmission profile identifier 39d in the access unit registration table 38, and identifies which transmission constraints 54b, 54c, and 54d should be imposed on a particular subscriber access unit. In the example shown, the subscriber access unit corresponding to subscriber profile entry 50a maps to transmission profile entry 52a, and entry 50b maps to 52b, as shown by the transmission profile indices P1 and P2.

Figure 4C:
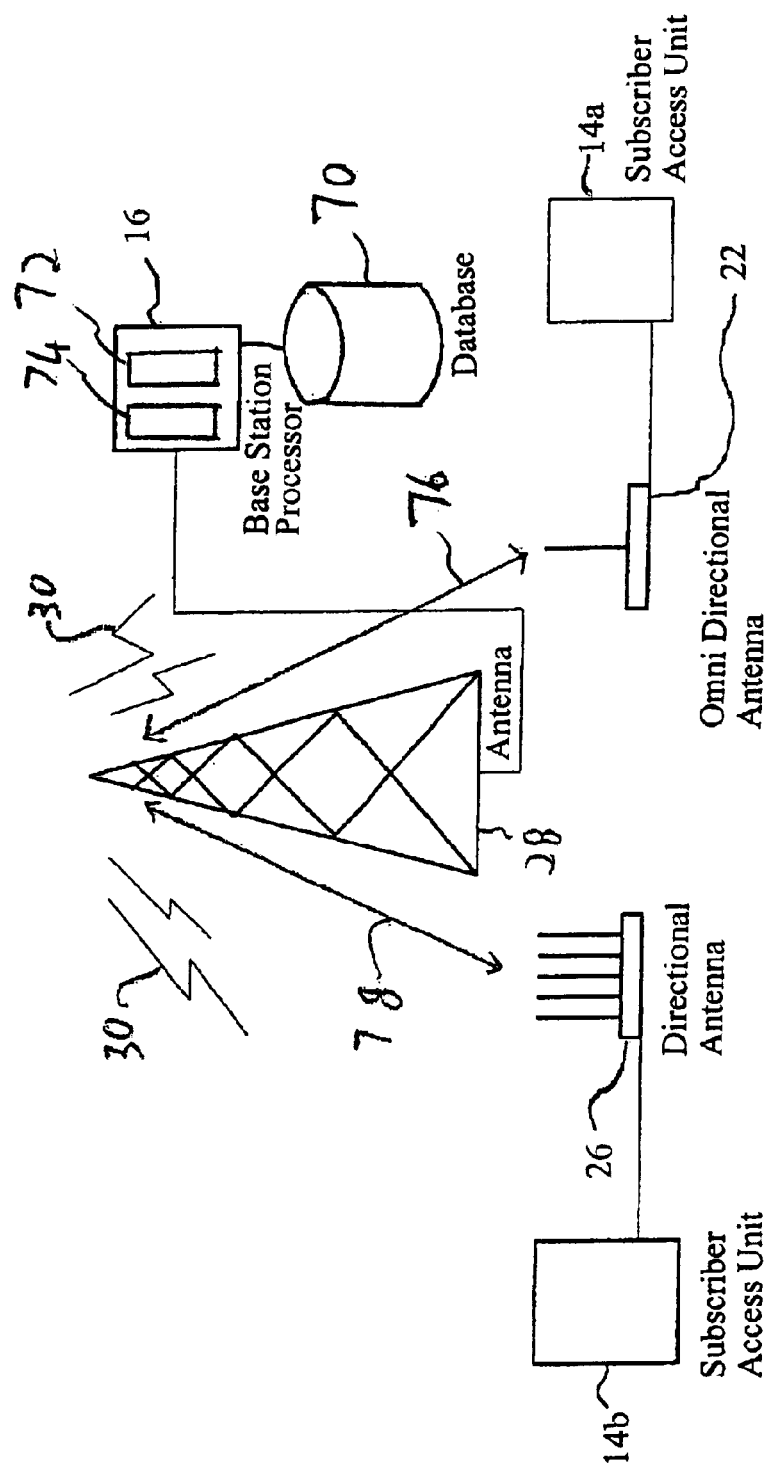

FIGS. 4a–4c show an example of registration and transmission. Referring to FIGS. 4a–4c, with respect to the system described in FIG. 2, two subscriber access units 14a and 14b are located in a cell served by the base station processor 16. Subscriber profile entry 56 corresponds to subscriber 14a, and subscriber profile entry 58 corresponds to subscriber 14b, both stored in a registration database 70 connected to the base station processor 16. As shown in the access unit registration table 38', subscriber 14a is a mobile user with an omnidirectional antenna, and corresponds to transmission profile entry 60 in the transmission constraint table 44'. A registration manager 72 in the base station processor 16 computes transmission constraints, and stores them in the transmission profile entry 60. A capacity manager 74 in the base station processor then applies the transmission constraints to transmissions between the subscriber access unit 14a and the base station processor 16, as shown by arrow 76. Accordingly, referring to the transmission profile entry 60, subscriber 14a is allocated only a power level of 23 dBm, so as to minimize interference with adjacent cells, has an FEC rate of ½ because it is likely that robust error correction will be needed, QPSK modulation is to be employed, and the maximum data rate allowed will be 0.050 mbps, so that subscriber access unit 14a will not be allocated an excessive number of wireless channels which could otherwise be allocated to more capable users. Subscriber access unit 14b, on the other hand, is a fixed user with a directional antenna having four degrees of freedom, as shown by subscriber profile entry 58, stored in the registration database 70. Accordingly, subscriber access unit 14b has a higher capacity than subscriber access unit 14a. Therefore, the transmission constraints imposed on subscriber 14b are less restrictive to allow higher throughput, shown by arrow 78. These constraints are computed by the registration manager 72 and are stored in transmission profile entry 62, including a power level of 33 dBm, since the subscriber access unit is employing a directional antenna, a faster but less robust FEC rate of ⅘, because less error correction is likely to be needed, a faster QAM 64 modulation, and a data rate of 0.366 mbps, which will result in more wireless channels being allocated to this device by the capacity manager 74 due to increased capacity for wireless traffic.

Figure 5:
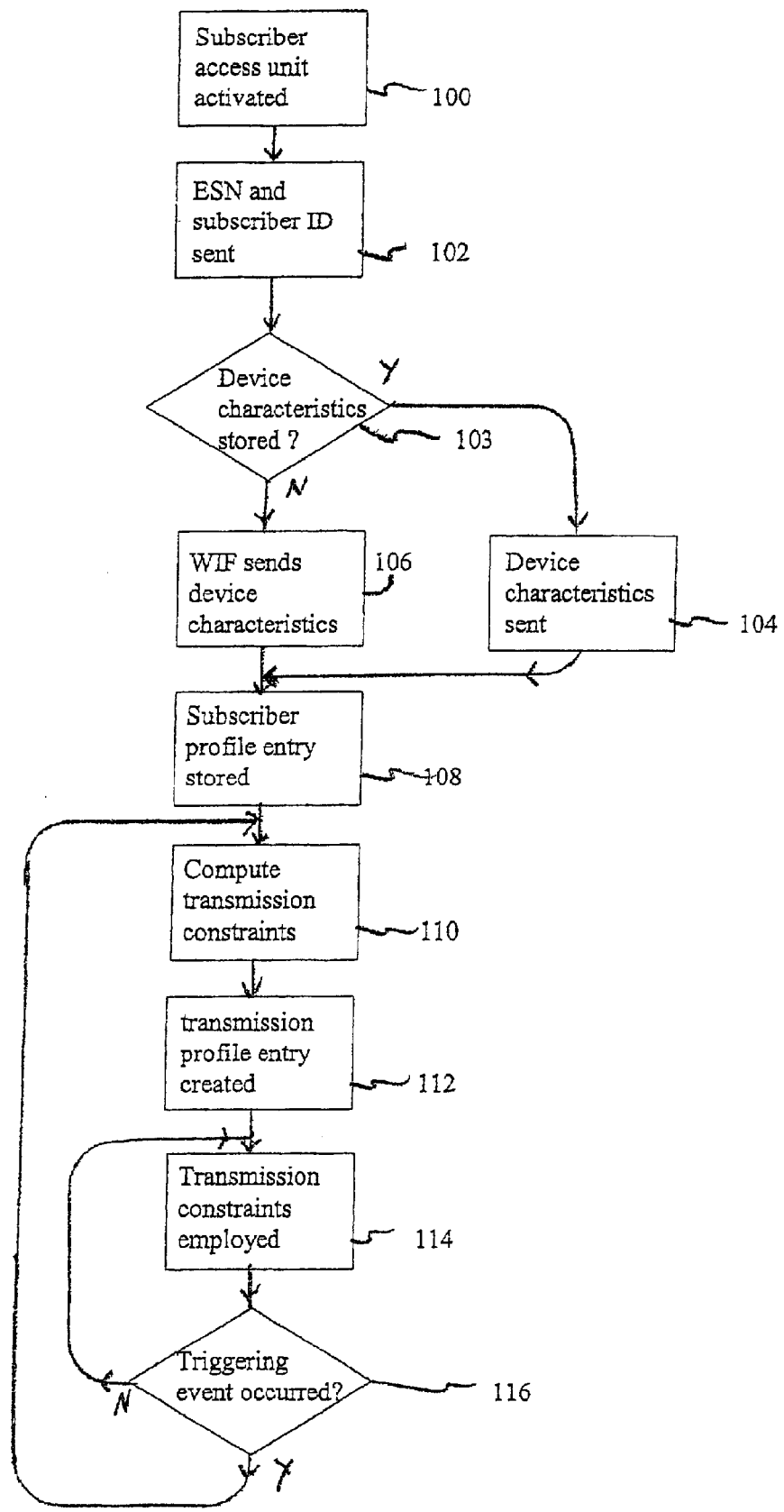
FIG. 5 shows a flowchart of subscriber access unit registration.

FIG. 5 shows a flowchart of subscriber access unit registration. Referring to FIG. 5, a subscriber access unit is activated by moving into a cell or being turned on in the cell, as depicted at step 100. An initial transmission occurs in which the ESN and the subscriber ID are sent to the base station processor, as shown at step 102. A check is performed to determine if the device characteristics are stored at the subscriber access unit, as shown at step 103. If the device characteristics are stored at the subscriber access unit, they are sent to the base station processor, as disclosed at step 104. Otherwise, the WIF sends the device characteristics to the base station processor based on the ESN or the subscriber ID, as depicted at step 106. The a subscriber profile entry containing the device characteristics are stored in the access unit registration table, as shown at step 108. Based on the device characteristics, a set of transmission constraints is computed, as disclosed at step 110. A transmission profile entry is created and mapped to the subscriber profile entry to store the transmission constraints for this subscriber access unit, as shown at step 112. The transmission constraints are then employed in wireless transmission between the subscriber access unit and the base station processor, as depicted at step 114, until a triggering event occurs. A triggering event is indicative of a need to recompute the transmission constraints and update the transmission profile entry. Such a triggering event may include expiration of a predetermined update interval, or a threshold event such as change in the number of subscriber access units supported. When a triggering event occurs, as shown at step 116, control reverts to step 110 and a new set of transmission constraints is computed, and control continues as described above.

Those skilled in the art should readily appreciate that the programs defining the subscriber device registration operations and methods defined herein are deliverable to a subscriber access unit and to a base station processor in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software executable by a processor or as a set of instructions embedded in a carrier wave. Alternatively, the operations and methods may be embodied in whole or in part using hardware components, such as Application Specific Integrated Circuits (ASICs), state machines, controllers or other hardware components or devices, or a combination of hardware, software, and firmware components.

While the system and method for subscriber device registration have been particularly shown and described with references to embodiments thereof, it will be understood by those skilled in the art that various changes in form and details may be made therein without departing from the scope of the invention encompassed by the appended claims. Accordingly, the present invention is not intended to be limited except by the following claims.

What is claimed is:

1. A method for managing transmission constraints based on subscriber device capabilities comprising:

determining a set of device capabilities corresponding to a transceiver device;

registering the device capabilities with a central wireless transceiver device;

computing a set of transmission constraints based on the device capabilities; and applying the transmission constraints corresponding to the transceiver device to transmissions between the transceiver device and the central transceiver device, wherein the device capabilities further include antenna characteristics, wherein the antenna characteristics include characteristics selected from the group consisting of omnidirectional, one degree of freedom, and multiple degrees of freedom, wherein applying the transmission constraints include allocating a greater data rate to a subscriber corresponding to an antenna having at least one degree of freedom than to a subscriber corresponding to an omnidirectional antenna.

2. A method for managing transmission constraints based on subscriber device capabilities comprising:

determining a set of device capabilities corresponding to a transceiver device;

registering the device capabilities with a central wireless transceiver device;

computing a set of transmission constraints based on the device capabilities; and applying the transmission constraints corresponding to the transceiver device to transmissions between the transceiver device and the central transceiver device, wherein the device capabilities include parameters selected from the group consisting of fixed, mobile, and pedestrian, wherein the power level to 23 dBm when the device capabilities indicate mobile.

3. A method for managing transmission constraints based on subscriber device capabilities comprising:

determining a set of device capabilities corresponding to a transceiver device;

registering the device capabilities with a central wireless transceiver device;

computing a set of transmission constraints based on the device capabilities; and applying the transmission constraints corresponding to the transceiver device to transmissions between the transceiver device and the central transceiver device, wherein the device capabilities include parameters selected from the group consisting of fixed, mobile, and pedestrian, wherein the transmission constraints include a power level greater than 23 dBm when the device capabilities indicate fixed.

4. A system for managing transmission constraints in a wireless network comprising:

a plurality of wireless transceiver devices operable to transmit and receive wireless messages, the wireless transceiver devices having device capabilities;

a registration manager operable to compute transmission constraints for the wireless transceiver devices based on the device capabilities; and a capacity manager operable to apply the transmission constraints to at least one of the wireless transceiver devices, wherein the device capabilities further include antenna characteristics, wherein the antenna characteristics include characteristics selected from the group consisting of omnidirectional, one degree of freedom, and multiple degrees of freedom, wherein the transmission constraints include allocating greater data rate to a subscriber corresponding to an antenna having at least one degree of freedom than to a subscriber corresponding to an omnidirectional antenna.

5. A system for managing transmission constraints in a wireless network comprising:

a plurality of wireless transceiver devices operable to transmit and receive wireless messages, the wireless transceiver devices having device capabilities;

a registration manager operable to compute transmission constraints for the wireless transceiver devices based on the device capabilities; and a capacity manager operable to apply the transmission constraints to at least one of the wireless transceiver devices, wherein the device capabilities include parameters selected from the group consisting of fixed, mobile, and pedestrian, wherein the transmission constraints limit the power level to 23 dBm when the device capabilities indicate mobile.

6. A system for managing transmission constraints in a wireless network comprising:

a plurality of wireless transceiver devices operable to transmit and receive wireless messages, the wireless transceiver devices having device capabilities;

a registration manager operable to compute transmission constraints for the wireless transceiver devices based on the device capabilities; and a capacity manager operable to apply the transmission constraints to at least one of the wireless transceiver devices, wherein the device capabilities include parameters selected from the group consisting of fixed, mobile, and pedestrian, wherein the transmission constraints include a power level greater than 23 dBm when the device capabilities indicate fixed.

* * * * *